United States Patent [19]

Lindsay et al.

[11] Patent Number: 5,740,998

[45] Date of Patent: Apr. 21, 1998

[54] EXTENDIBLE ARMS

[75] Inventors: Richard Arthur Lindsay, Eye; Robin Andrew Sayer, Bury. St. Edmunds, both of Great Britain

[73] Assignee: Vitec Group plc, United Kingdom

[21] Appl. No.: 612,050

[22] Filed: Mar. 7, 1996

[30] Foreign Application Priority Data

Mar. 10, 1995 [GB] United Kingdom ............... 9504930

[51] Int. Cl.⁶ ........................................... F16M 11/00
[52] U.S. Cl. ................................. 248/407; 248/188.5
[58] Field of Search ......................... 248/407, 188.5, 248/163.1, 161, 157; 352/246; 396/419, 428

[56] References Cited

U.S. PATENT DOCUMENTS

| | | |
|---|---|---|
| 2,960,095 | 11/1960 | Smith, Jr. . |
| 4,079,978 | 3/1978 | McMullin ............... 248/188.5 X |
| 4,254,423 | 3/1981 | Reinhard . |
| 4,582,079 | 4/1986 | Fields . |
| 4,706,916 | 11/1987 | Cullmann et al. ............... 248/188.5 X |
| 5,421,549 | 6/1995 | Richards ..................... 248/396 X |

FOREIGN PATENT DOCUMENTS

| | | |
|---|---|---|
| 451122 | 7/1936 | United Kingdom . |
| 481199 | 3/1938 | United Kingdom . |
| 565820 | 11/1944 | United Kingdom . |

*Primary Examiner*—Ramon O. Ramirez
*Attorney, Agent, or Firm*—Kenyon & Kenyon

[57] ABSTRACT

The disclosure relates to an extendible arm for a camera stand or the like, comprising an outer elongate rigid sleeve and an inner elongate rigid sleeve telescopically slidable with respect to the outer sleeve to extend therefrom by a variable amount. One end of the inner sleeve disposed within the outer sleeve has a detent mechanism for locking the inner sleeve in any of a number of positions of extension with respect to the outer sleeve and a release member for the detent mechanism is provided at the other end of the inner sleeve which projects from the outer sleeve with a connection between the release member and detent mechanism extending through the inner sleeve for remote operation of the detent mechanism by the release member.

4 Claims, 2 Drawing Sheets

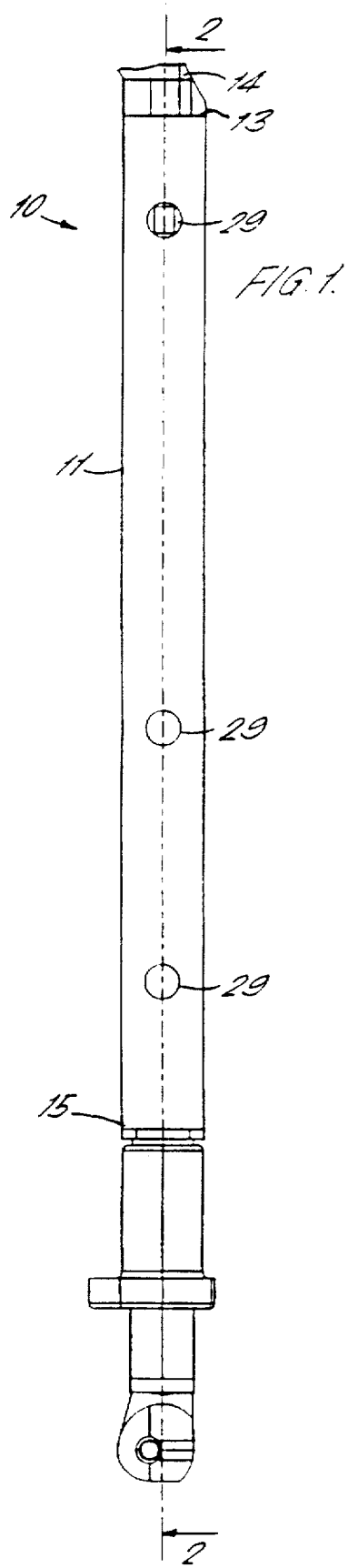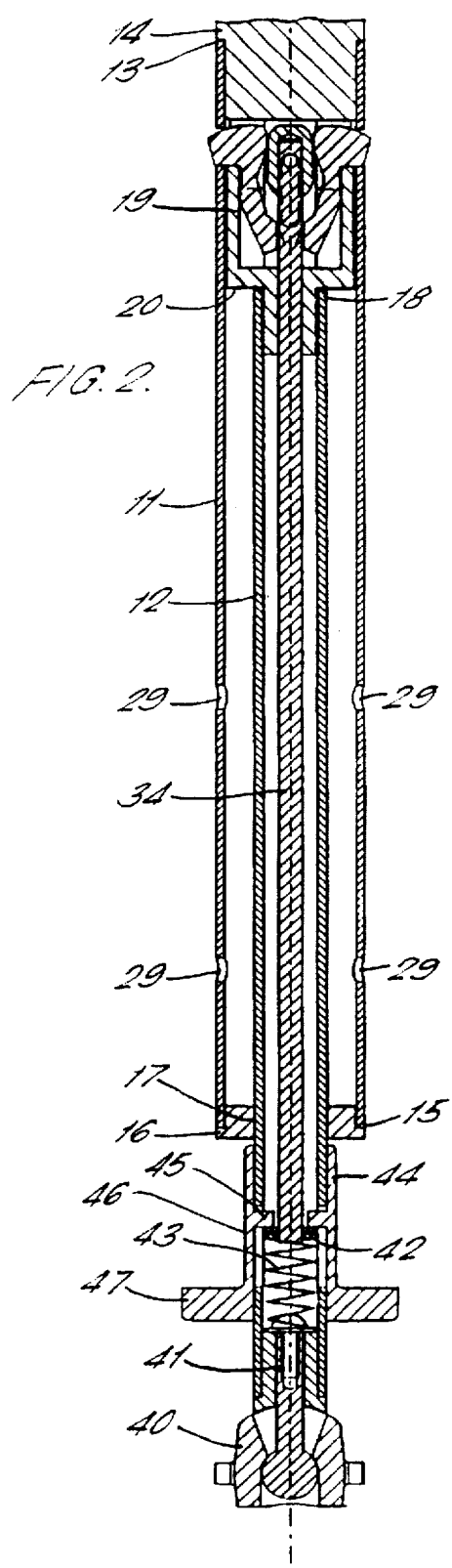

EXTENDIBLE ARMS

BACKGROUND OF THE INVENTION

1. Field of the Invention

This invention relates to extendible arms for camera stands and the like and in particular for spreader units embodied in camera stands to support the legs of the stand. One spreader unit in which the extendible arm may be incorporated is described and illustrated in our UK Patent Application No. 9504929.2.

2. Background Prior Art

Telescopically extendable struts are widely used in a variety of applications. In some instances friction between members is relied on to hold the strut at a particular extension. Where rigidity is required locking arrangements are provided. These can take the form of push buttons mounted on an inner member to project and engage in a selected hole in a range of holes in an outer member. Other arrangements involve a rotary locking device at the open end of the outer member to lock with the inner member. For adjustment of all these arrangements it is necessary for the operator to reach to the region where an inner member extends from an outer member to operate the lock.

SUMMARY OF THE INVENTION

This invention provides an extendible arm for a camera stand or the like, comprising an outer elongate rigid sleeve, an inner elongate rigid sleeve telescopically slidable with respect to the outer sleeve to extend therefrom by a variable amount, one end of the inner sleeve disposed within the outer sleeve having a detent mechanism for locking the inner sleeve in any of a number of positions of extension with respect to the outer sleeve, a release member for the detent mechanism at the other end of the inner sleeve which projects from the outer sleeve and a connection between the release member and detent mechanism extending through the inner sleeve for operation of the detent mechanism by the release member.

The detent mechanism may comprise at least one detent member mounted on said one end of the inner sleeve for radial movement with respect to the sleeve toward and away from the outer sleeve and the outer sleeve has stop means to receive the detent member at selected positions along the outer sleeve to lock the inner and outer sleeves together.

More specifically the detent member may be pivotally supported on the inner sleeve for movement into and out of engagement with the outer sleeve.

In one arrangement according to the invention said one end of the inner sleeve may have an enlarged head which is a sliding fit in the outer sleeve and said detent member is pivotally supported in the head to extend and retract into and out of engagement with said stop means.

In the preferred arrangement the detent member comprises a rocker arm pivotally supported part-way along the arm in the head and having a detent finger at one end thereof to project outwardly of the head, the head having an outwardly facing slot for the detent finger and means are provided within the head operated by said release member for pivoting the rocker to extend and retract the detent finger thereon into and out of engagement with said stop means.

In the preferred arrangement the detent member comprises a rocker arm pivotally supported part-way along the arm in the head and having a detent finger at one end thereof to project outwardly of the head, the head having an outwardly facing slot for the detent finger and means are provided within the head operated by said release member for pivoting the rocker to extend and retract the detent finger thereon into and out of engagement with said stop means.

The outer sleeve may have apertures at spaced locations along the sleeve to receive the detent finger to lock the sleeves together.

The rocker arm may have an inner cam surface and the means for pivoting the arm comprises a shuttle mounted for longitudinal movement in the head and engageable with the cam surface on the arm which is shaped so that movement of the shuttle in one direction tilts the arm to extend the detent finger from the slot and in the opposite direction retracts the detent finger into the slot.

The cam surface on the inner side of the rocker arm may comprise inwardly projecting cam lobes at either end of the rocker arm between which the rocker arm pivots and with which the shuttle is engageable to tilt the arm in one or the other direction. The cam lobes may each have a ramp to ride up an end of the shuttle to pivot the arm in one or another direction and flats at the peaks of each lobe to engage a side of the shuttle and thereby hold the arm with the detent finger extended or retracted respectively.

Preferably a pair of rocker arms are provided on opposite sides of the head and the shuttle is disposed between the rocker arms to extend and retract the detent fingers on the arms.

Further a rod may connect the shuttle to the release member at said other end of the inner sleeve for operation of the shuttle.

The release member may comprise a trigger member secured to the end of the rod at said other end of the inner sleeve and projecting outwardly of the sleeve through longitudinal slots in the sleeve.

More specifically the trigger member may have a cover encircling the inner sleeve to enclose and conceal the slots in the sleeve over the range of movement of the trigger.

A spring may be provided in the sleeve acting on the release member in a direction to extend said detent, the detent being released by movement of the release member against the action of the spring.

BRIEF DESCRIPTION OF THE DRAWINGS

FIG. 1 is a side elevation view of a telescopic arm;

FIG. 2 is a cross-section on the line 2—2 on FIG. 1;

DESCRIPTION OF THE PREFERRED EMBODIMENT

Figure 3:
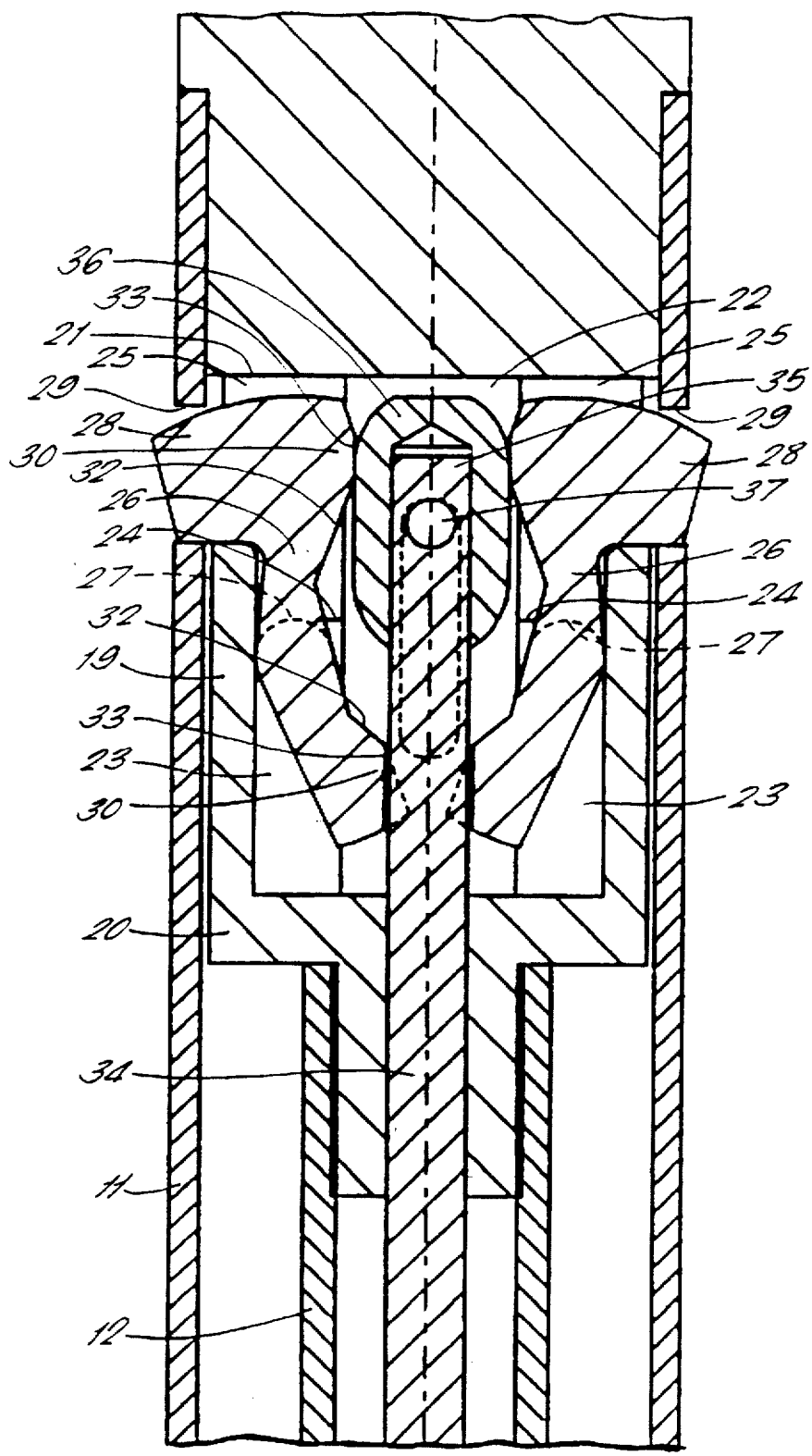
FIG. 3 is an enlarged view of the upper end of the arm as shown in FIG. 2.

The drawings show a telescopic arm which is suitable for use in a variety of applications but, in this particular instance, is intended for use in a spreader unit for stabilising the legs of a camera mounting tripod. The spreader unit comprises a central hub and three such arms radiating from the hub and coupled to the legs of the tripod to hold the legs in their selected spread orientation and thereby stabilizing the tripod. An example of such a spreader unit is described and illustrated in our UK Patent Application No. 9504929.2.

The telescopic arm is indicated generally at 10 and comprises an outer elongate rigid metal sleeve 11 of oval cross-section and an inner elongate rigid sleeve 12 of circular cross-section spaced within the outer sleeve. The outer sleeve 11 is closed at one end 13 by an attachment 14 for securing the sleeve to the central hub of, for example, a tripod. The other end 15 of the outer sleeve is closed by a plug 16 secured in the end of the sleeve and having a central bore 17 through which the inner sleeve 12 extends. The end 18 of the inner sleeve within the outer sleeve has an enlarged oval cross-section head 19 secured thereto by an integral spigot which is fixed in the end 18 of the tube. The head 19 is a sliding fit in the outer sleeve and thus the inner sleeve is supported for sliding movement into and out of the outer sleeve.

The head 19 has an inner end 20 adjacent sleeve 12 and an outer end 21. A bore 22 extends centrally in to the head 19 from the outer end and has radial slots 23 on either side thereof which extend lengthwise of the bore. Midway along each slot 23 from the outer end of the head 19 the sides of the slot 23 are stepped as at 24 to reduce the slot width. The end of the slots 23 at the outer end of the head have radial openings 25 to the outer side of the head 19. A pair of rocker arms 26 are located for pivotal movement in the respective slots. Each arm is flanked by integral arcuate bearing faces 27 formed midway along the arms to engage with the abutments in the slots to allow limited pivoting and movements of the arms in the slots 23.

The ends of the rocker arms 26 of the outer end of the head 19 have outwardly extending detent fingers 28 which project through said openings in the head 19. The outer tube 11 is formed with pairs of apertures 29 in the tube wall at spaced locations along the tube to receive the detent fingers 28 to lock the tubes together at different positions of telescopic adjustment of the inner tube with respect to the outer tube.

The rocker arms 26 each have a pair of cam lobes 30, 31 formed on their inner sides adjacent the respective end of each arm. Each lobe comprises a ramp 32 and a flat 33 at the peak of the lobe. A push rod 34 extends through the sleeve 12 and has one end 35 extending into the bore in the head 19. A shuttle 36 is mounted on the end 32 of the push-rod and is secured thereto by a pin 37. The shuttle 36 engages between the rocker arms 26.

Movement of the shuttle towards the outer end 21 of the head 19 causes the shuttle 36 to engage ramps 32 of the cam lobes 30 on the rocker arms 26 forcing the ends of the arms apart to extend the detent fingers 28 from the head. Eventually the shuttle 36 locates between the flats 33 of the cam lobes 30 with the sides of the shuttle 36 engaging the flats 33 to lock the outer ends of the rocker arms 26 with the detent fingers 28 in their extended positions as shown with the detent fingers 28 engaged in the selected apertures 29 in the outer sleeve 11. The sides of the detent fingers 28 which engage the openings in the head and the aperture in the outer sleeve 11 tie at right angles to the sleeve/head axis so that there is no tendency for the outer sleeve to force the detent fingers 28 inwardly. In any event the shuttle 36 is locked between the ends of the rocker arms 26 preventing inward movement of the arms with respect to the shuttle 36. Thus the risk of the head inadvertently releasing the outer sleeve is most unlikely.

When the shuttle 36 is moved towards the inner end of the head, the cam lobes 30 of the rocker arms 26 are released and the shuttle 36 engages between the cam lobes 31 at the other ends of the arms forcing those ends of the arms apart and thereby retracting the detent fingers 28 disengaging them from the slots 24 to allow the inner and outer sleeves of the arm to be adjusted.

The other end of the inner sleeve 12 projects from the outer sleeve 11 through the plug 16 and an attachment 40 is secured to the end of the sleeve by a plug 41 glued into the end of the sleeve. The attachment 40 is connected to a tripod leg.

A cross-pin 42 is fixed in the end to project to either side of the push-rod and a compression spring 43 acts between the plug 41 and cross-pin to force the push rod in a direction to extend the aforesaid detent fingers for locking the inner and outer sleeves together. A collar 44 is slidably mounted on the end part of the inner sleeve 12 projecting from the outer sleeve and is formed with radially inwardly extending lugs 45 which pass through elongate slots 46 in the inner sleeve to engage the opposite side of the cross-pin 42 to the compression spring. The collar 44 is formed with an encircling finger plate 47 for drawing the collar against the action of the spring 45 to retract the detent fingers 28, 30, 31 for adjustment of the arm. The length of the collar 44 is such that the slots 46 for the lugs 45 are concealed throughout its range of movement.

The sleeve 12 may be formed with encircling grooves at spaced locations along the sleeve which correspond to positions of adjustment of the inner and outer sleeve determined by the locations of the apertures 26 in the outer sleeve so that when a groove is revealed at the bush 16, the detent fingers are aligned with an appropriate pair of slots 26. Conveniently the grooves may be coloured to identify particular positions of adjustment of the arms.

We claim:

1. An extendible arm for a stand comprising:

an outer elongate rigid sleeve, an inner elongate rigid sleeve telescopically slidable within the outer sleeve to extend therefrom by a variable amount, a detent mechanism located within a first end of the inner sleeve disposed within the outer sleeve for locking the inner sleeve in any of a number of positions of extension with respect to the outer sleeve, wherein the detent mechanism includes at least one rocker arm, the at least one rocker arm having a first camming surface located on a distal side of a pivot point of the at least one rocker arm and a second camming surface located on a proximal side of the pivot point, a release member for the detent mechanism, the release mechanism being located at a second end of the inner sleeve which projects from the outer sleeve, a connecting member extending within the inner sleeve from a proximal end coupled to the release member to a distal end coupled to the detent mechanism, a shuttle member coupled to the distal end of the connecting member, wherein an outer surface of the shuttle member is formed as a contacting surface and wherein the shuttle is moveable slidably within the inner sleeve between a distal-most position in which the contacting surface contacts the first camming surface and in a proximal-most position, the contacting surface contacts the second camming surface.

2. An extendible arm for a stand comprising:

an outer elongate rigid sleeve including a plurality of apertures extending therethrough, an inner elongate rigid sleeve telescopically slidable within the outer sleeve to extend therefrom by a variable amount, a detent mechanism located within a first end of the inner sleeve disposed within the outer sleeve for locking the inner sleeve in any of a number of positions of extension with respect to the outer sleeve, wherein the detent mechanism includes a plurality of rocker arms rotatably coupled to the inner sleeve so that, when a respective rocker arm is in a locking position, a detent surface of the respective rocker arm extends through a respective one of the apertures, each rocker arm having a first camming surface located on a distal side of a pivot point of the at least one rocker arm and a second camming surface located on a proximal side of the pivot point, a release member for the detent mechanism, the release mechanism being located at a second end of the inner sleeve which projects from the outer sleeve, a connecting member extending within the inner sleeve from a proximal end coupled to the release member to a distal end coupled to the detent mechanism, a shuttle member coupled to the distal end of the connecting member, wherein an outer surface of the shuttle member is formed as a contacting surface and wherein the shuttle member is moveable slidably within the inner sleeve along an axis of the inner sleeve between a distal-most position in which the contacting surface contacts each of the first camming surfaces and in a proximal-most position, the contacting surface contacts each of the second camming surfaces and wherein in the distal-most position, a distal end of the shuttle member is located between the rocker arms.

3. An extendible arm as claimed in claim 2, wherein each of the first camming surfaces includes a ramping portion which, as the shuttle member is moved from the proximal-most position to the distal-most position, is initially contacted by the contacting surface and a flat portion extending substantially parallel to the axis.

4. An extendible arm as claimed in claim 2, when the shuttle member is in the distal-most position, the rocker arms are urged into the locking position.

* * * * *